Jan. 19, 1926.  1,570,094
J. O. STEVENS
FRUIT GRADER
Filed April 13, 1925    2 Sheets-Sheet 1
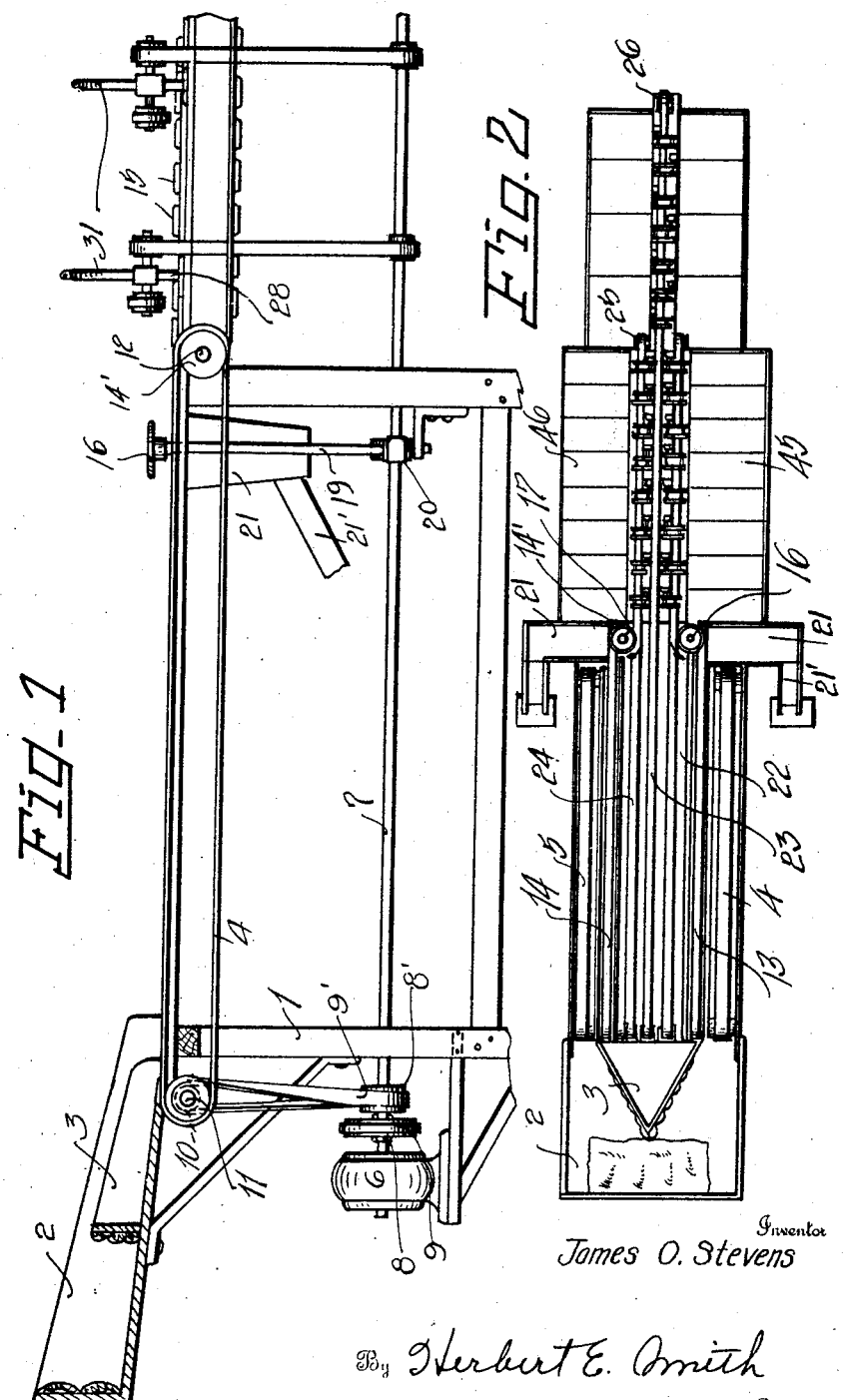

Jan. 19, 1926. 1,570,094
J. O. STEVENS
FRUIT GRADER
Filed April 13, 1925 2 Sheets-Sheet 2
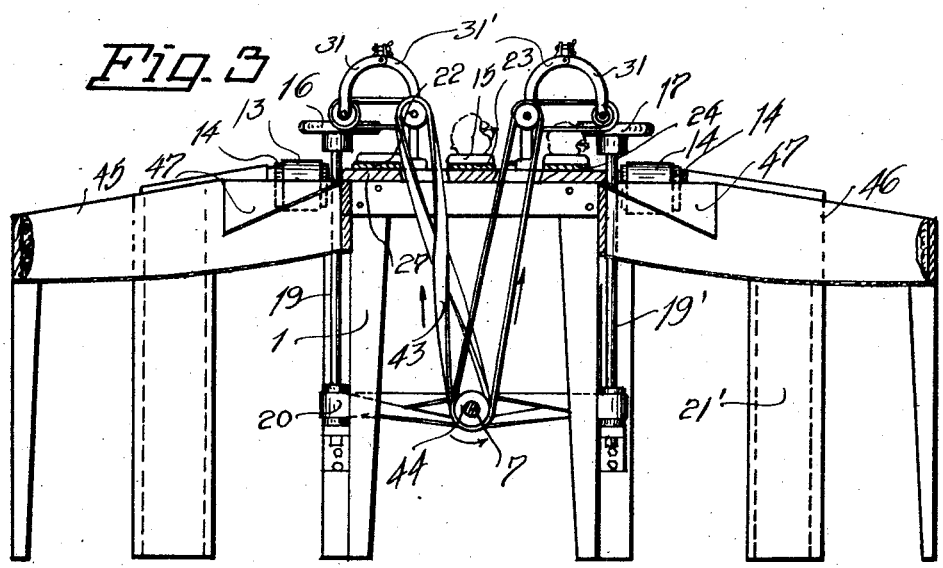
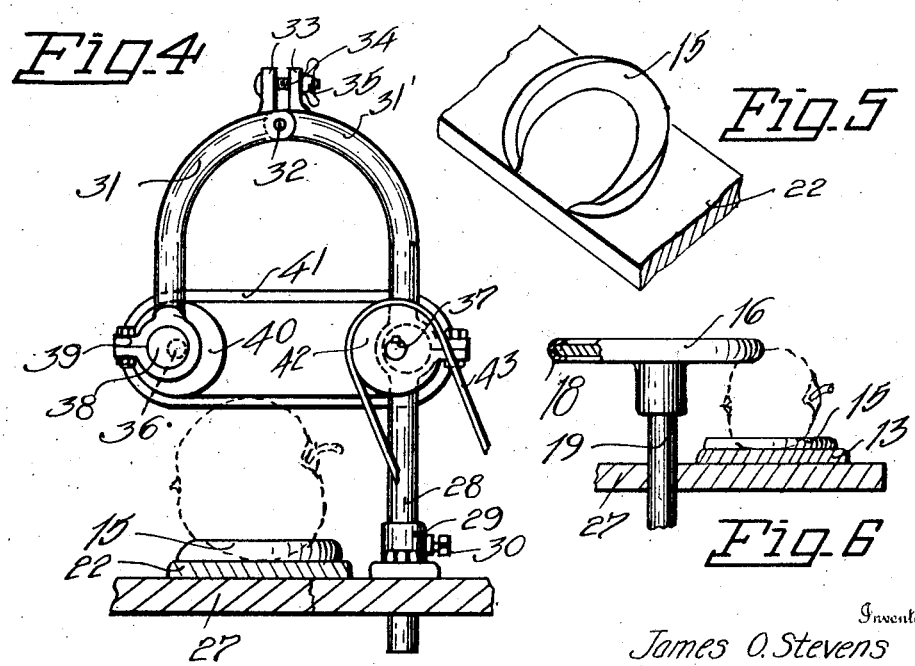
Inventor
James O. Stevens
By Herbert E. Smith
Attorney Patented Jan. 19, 1926.

1,570,094

UNITED STATES PATENT OFFICE.

JAMES O. STEVENS, OF POST FALLS, IDAHO.

FRUIT GRADER.

Application filed April 13, 1925. Serial No. 22,538.

*To all whom it may concern:*

Be it known that I, JAMES O. STEVENS, a citizen of the United States, residing at Post Falls, in Kootenai County and State of Idaho, have invented certain new and useful Improvements in Fruit Graders, of which the following is a specification.

The present invention relates to improvements in fruit graders especially adapted for use in sizing apples, oranges, lemons, grapefruit and similar fruits.

In carrying out my invention I utilize a hopper and distributing or sorting table at which the attendants stand and sort the apples as they are fed from the hopper. The sorters pick up the apples, selecting the various grades and place them upon endless conveyers or belts preferably formed with carrying pockets. The culls are first disposed of by the sorters, and the higher grade apples which are placed upon selected conveyers are carried to position where they are distributed to their respective bins or other receptacles.

The invention consists in certain novel combinations and arrangements of parts whereby the apples are removed from the conveyers and distributed laterally of the conveyers to the bins or receptacles, as will hereinafter be more fully pointed out and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in side elevation and partly in section at the feed end of the grading machine.

Figure 2 is a top plan view of the entire machine, on a reduced scale.

Figure 3 is a transverse vertical sectional view of the machine showing the lateral distributers, their operating means and the bins or receptacles at the sides of the machine.

Figure 4 is a detail view enlarged of one of the distributers which are arranged at the sides of the longitudinal center of the machine for laterally disposing of the apples.

Figure 5 is a detail view showing in perspective a portion of one of the longitudinal conveyers or endless belts with a carrier-pocket thereon.

Figure 6 is a detail view of one of the horizontally disposed rotary distributers for the culls.

In carrying out my invention I utilize a main frame 1 provided at the front or charging end with a feed hopper 2 in which a V-shaped guide 3 is provided for the apples as they pass to the longitudinally disposed, horizontal sorting belts or conveyers 4 and 5. These belts are disposed one at each side of the machine and are of sufficient length to accommodate apples that are to be sorted by an attendant standing at each side of the machine.

A motor is indicated at 6 for supplying power for the conveyers and distributers, and an operating shaft 7 is journaled in suitable bearings in the frame and extends longitudinally at the center of the machine.

Beneath the feed hopper the driving mechanism is arranged and comprising a pulley 8 on the motor shaft and transversely disposed belt 9 which passes over a pulley on the power shaft 7 at the center of the machine. A pulley 8' on the power shaft has a belt 9' passing over a pulley 10 on the transverse shaft 11 journaled in bearings beneath the hopper and carrying rollers or pulleys for the sorting belts 4 and 5, at one end. The other ends of these sorting belts are supported on transverse shaft and rollers indicated at 12 in Figure 1.

The culls or undesirable apples are disposed of after they have been picked from the sorting belts 4 and 5 by the sorters by placing them upon longitudinally extending belts 13 and 14 located between the sorting belts and passing over the rollers 14'. These cull belts or conveyers are a little longer than the sorting belts, and as may be the case with all of the endless belts they are provided at required intervals with spaced pockets or carriers 15 in the shape of a horse shoe. The pockets extend transversely of the belts with their openings in each case at the outer side of the belt, that is away from the longitudinal center of the machine. As seen in Figure 5 the ends of the pocket extend around sufficiently to normally retain the apples therein while traveling toward their destination, but these ends do not retard the apples when force is applied thereto to displace them laterally from the belts.

For laterally displacing and distributing the culls I employ a pair of rotary heads 16 and 17, one at each side of the longitudinal center of the machine and in cooperative relation to the cull belts 13 and 14. The rotary heads are covered with cushions or rubber casings 18 and rotate in opposite directions in horizontal planes. They project over the cull belts a sufficient distance to lie in the path of the apples on the cull belts, and as the apples contact with the heads the rotary action of these heads changes the direction of travel of the culls and displaces them from the belts. The rotary heads are carried by vertical shafts 19 and 19' operated from the power shaft 7 by means of crossed belts 20, and as the displaced apples or culls are flipped from their pockets they pass through laterally projecting chutes 21 to waiting receptacles 21' for proper disposal.

Three longitudinally disposed conveyers or endless belts 22, 23, and 24 are employed for carrying the apples and each belt may be provided with similar pockets 15 as described. The intermediate belt 23 is the longest and projects some distance beyond the remaining belts 22 and 24. They are all supported at one end by the drive shaft 11 while shafts and rollers 25 and 26 respectively are employed to support the outer and intermediate belts.

At suitable intervals along each of the three belts are located a series of spaced distributers designed to flip the apples from their carrier pockets and pass them laterally of the machine.

These distributers are located above the table top 27 and each is supported on an adjustable post 28 in the form of a crane to permit passage thereunder of the conveyer belt.

The post is vertically adjustable in a supporting collar 29 fixed to the table top, and by means of the set bolt 30 the post may be held in adjusted position.

As indicated in Figure 3 the largest grade of apples may be placed on the conveyer 23 at the center of the machine and smaller grades placed on the outer conveyer belts. All of the distributers are adjustable vertically to accommodate them to various sizes of apples, permitting smaller ones to pass and diverting the travel of those of desired sizes.

The distributers are of similar construction, and each post is fashioned with a curved upper end 30' to which a complementary curved arm 31 is pivoted at 32 to form an arch with the free end of the arm or curved arm in each case toward the outer side of the machine. The arm 31 may be held in adjusted position with relation to the post and for this purpose these members are provided with perforated ears 33, a lock bolt 34 and lock nut 35.

Two shafts 36 and 37 are supported in the crane in eccentric bearings 38 as in Figure 4. These bearings are in the form of round blocks retained by clamps 39 of the arch or crane, and it will be apparent that the blocks may be turned in their clamps to elevate the shafts and to move them relatively one to another. Each shaft is provided with a pulley 40 and the pulleys are connected by a flexible belt 41. Thus by adjusting the crane on its pivot 32 the tension of the belt may be varied, and by adjusting the eccentrically supported shafts the altitude of the belt 41 above the longitudinally extending conveyer may be varied to adapt the transverse belt to various sizes of apples.

The shaft 37 is utilized as the driving shaft for the distributer belt 41 and this shaft is provided with a pulley 42 over which the drive belt 43 is passed, said belt being crossed and passing around a pulley 44 on the power shaft 7. One series of belts 43 is crossed and the other series is straight in order that the two series of transversely disposed distributing belts 41 may be operated in different or opposite directions for contact with an apple as indicated by dotted lines in Figure 4. The lower flight of the belt contacts with the apple, passes it out of its carrier pocket and moves it laterally of the machine into bins 45 and 46 arranged at opposite sides of the machine, chutes 47 being used to deposit the apples in the bins as shown in Figure 3.

The distributing belts may be of resilient material as rubber, and the apples are preferably laid on edge in the pockets, which pockets may also be made of rubber or other cushioning material for protection to the apples.

By the use of a machine of this character the apples may quickly be sorted and distributed with accuracy and delivered to the bins in first class condition for packing.

Having thus fully described my invention, what I claim as new and desire to secure by Letters Patent is—

1. The combination with a longitudinal conveyer of a laterally disposed crane, means for adjusting said crane vertically with relation to said conveyer, an endless distributer belt carried by said crane in the path of movement of the fruit on the conveyer, and means for positively adjusting the tension of the belt.

2. A supporting device for a distributer comprising a post having a bearing therein and a curved upper end, a curved arm pivoted to said upper end and having a bearing therein for the distributer, and means for securing said pivoted parts in adjusted position.

3. A supporting crane having a pivoted adjustable arm, bearings in said crane and arm, bearing blocks in said bearings, shafts eccentrically journaled in said blocks and pulleys on said shafts, and an endless distributer belt on said pulleys.

4. A supporting crane having complementary bearings, blocks in said bearings, shafts eccentrically journaled in said blocks, pulleys on the shafts and an endless distributer belt carried on said pulleys.

5. A supporting crane having an adjustable, pivoted arm, bearing clamps in said crane and arm, bearing blocks in said bearing clamps, shafts eccentrically journaled in said blocks, pulleys on the shafts and an endless distributer belt carried by said pulleys.

In testimony whereof I affix my signature.

JAMES O. STEVENS.